(12) United States Patent
Zeng

(10) Patent No.: US 12,272,984 B2
(45) Date of Patent: Apr. 8, 2025

(54) FAST/SLOW CHARGING SELF-ADAPTION METHOD AND APPARATUS, AND ELECTRONIC DEVICE

(71) Applicant: ZTE CORPORATION, Shenzhen (CN)

(72) Inventor: Haijun Zeng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 399 days.

(21) Appl. No.: 17/760,491

(22) PCT Filed: Jan. 26, 2021

(86) PCT No.: PCT/CN2021/073834
§ 371 (c)(1),
(2) Date: Aug. 10, 2022

(87) PCT Pub. No.: WO2021/223470
PCT Pub. Date: Nov. 11, 2021

(65) Prior Publication Data
US 2023/0135771 A1 May 4, 2023

(30) Foreign Application Priority Data

May 8, 2020 (CN) .......................... 202010381929.9

(51) Int. Cl.
*H02J 7/00* (2006.01)
*G01J 1/44* (2006.01)
(52) U.S. Cl.
CPC ........... *H02J 7/007188* (2020.01); *G01J 1/44* (2013.01)
(58) Field of Classification Search
CPC ....... H02J 7/007188; G01J 1/44; Y02E 60/10; H01M 10/44
See application file for complete search history.

(56) References Cited

U.S. PATENT DOCUMENTS

2019/0109483 A1* 4/2019 Huo .......................... H02J 7/04

FOREIGN PATENT DOCUMENTS

CN 106356949 A 1/2017
CN 106785130 A 5/2017
(Continued)

OTHER PUBLICATIONS

Translated document for foreign reference CN 106356949 (Year: 2017).*

(Continued)

*Primary Examiner* — Georgia Y Epps
*Assistant Examiner* — Monica T Taba
(74) *Attorney, Agent, or Firm* — Vivacqua Crane, PLLC

(57) ABSTRACT

A fast/slow charging self-adaption method is disclosed, including: detecting a light index of an environment where a terminal is located according to a preset cycle; comparing the light index with a preset light index threshold; and selecting a fast charging mode or a slow charging mode according to a result of comparison. A fast/slow charging self-adaption apparatus is further disclosed, including: a detection module, configured for detecting a light index of an environment where a terminal is located according to a preset cycle; a comparison module, configured for comparing the light index with a preset light index threshold; and a processing module, configured for selecting a fast charging mode or a slow charging mode according to a result of comparison between the light index and the preset light index threshold.

12 Claims, 4 Drawing Sheets

(56) References Cited

FOREIGN PATENT DOCUMENTS

| CN | 107681215 A | 2/2018 |
|----|-------------|--------|
| CN | 107742757 A | 2/2018 |
| CN | 109687547 A | 4/2019 |

OTHER PUBLICATIONS

Translated document for foreign reference CN 106785130 (Year: 2017).*
European Patent Office. Extended European Search Report for EP Application No. 21800163.4, mailed May 19, 2023, pp. 1-11.
International Searching Authority. International Search Report and Written Opinion for PCT Application No. PCT/CN2021/073834 and English translation, mailed Apr. 15, 2021, pp. 1-9.

* cited by examiner

FAST/SLOW CHARGING SELF-ADAPTION METHOD AND APPARATUS, AND ELECTRONIC DEVICE

CROSS-REFERENCE TO RELATED APPLICATIONS

This application is a national stage filing under 35 U.S.C. § 371 of international application number PCT/CN2021/073834, filed Jan. 26, 2021, which claims priority to Chinese patent application No. 202010381929.9 filed May 8, 2020. The contents of these applications are incorporated herein by reference in their entirety.

TECHNICAL FIELD

The present application relates to the charging technology, and in particular to a fast/slow charging self-adaption method and apparatus, and an electronic device.

BACKGROUND

Nowadays, mobile intelligent terminals have been widely applied at a high popularization rate. In order to design fashionable appearances, manufacturers tend to make mobile intelligent terminals thinner and thinner in structure. However, due to the problems of power consumption, great standby power consumption, etc., the capacity of batteries is required to be higher and higher, and at the same time, charging is required to be faster and faster as well. At present, all manufacturers realize fast charging by increasing voltage or current. However, this leads to a result that the battery life becomes shorter and shorter and that the longer a terminal is used, the less the battery capacity becomes, which makes users have to replace mobile intelligent terminals or batteries every year or even half a year, causing great inconvenience and waste to users. In fact, users do not need fast charging all the time, and some users may be more concerned about striking a balance between compatibility of battery life and charging speed of mobile intelligent terminals. For example, users of mobile intelligent terminals may charge the mobile intelligent terminals at night or when the terminals are not used for a long time, and in this case, they are more concerned about whether the endurance of the fully charged terminals is long enough and whether the service lives of the terminals can be longer, rather than whether the charging is fast.

SUMMARY

In order to address the aforementioned technical problem, the present application provides a fast/slow charging self-adaption method and apparatus, and an electronic device, so as to realize the automatic slow charging of batteries under non-urgent need to prolong battery life.

The present application provides a fast/slow charging self-adaption method, including: detecting a light index of an environment where a terminal is located according to a preset cycle; comparing the light index with a preset light index threshold; and selecting a fast charging mode or a slow charging mode according to a result of comparison.

According to another aspect, the present application further provides a fast/slow charging self-adaption apparatus, including: a detection module, a comparison module, and a processing module. The detection module is configured for detecting a light index of an environment where a terminal is located according to a preset cycle. The comparison module is configured for comparing the light index with a preset light index threshold. The processing module is configured for selecting a fast charging mode or a slow charging mode according to a result of comparison between the light index and the preset light index threshold.

According to yet another aspect, the present application further provides an electronic device, including: a processor; and a memory storing computer-executable instructions which, when executed by the processor, cause the processor to execute the aforementioned fast/slow charging self-adaption method.

According to yet another aspect, the present application further provides a computer-readable storage medium storing one or more programs which, when executed by an electronic device containing a plurality of applications, cause the electronic device to execute the aforementioned fast charging and slow charging self-adaption method.

BRIEF DESCRIPTION OF DRAWINGS

The accompanying drawings illustrated herein are used to provide a further understanding of the present application and constitute a part of the present application. The illustrative embodiments of the present application and description thereof are used to explain the present application rather than constitute an improper limitation to the present application.

DETAILED DESCRIPTION

In order to make the above objective, features and advantages of the present application clearer, the technical scheme in embodiments of the present application will be clearly and completely described below with reference to the accompanying drawings in the embodiments of the present application. It should be noted that the embodiments in the present application and the features in the embodiments may be arbitrarily combined with one another to derive other embodiments not explicitly described.

Figure 1:
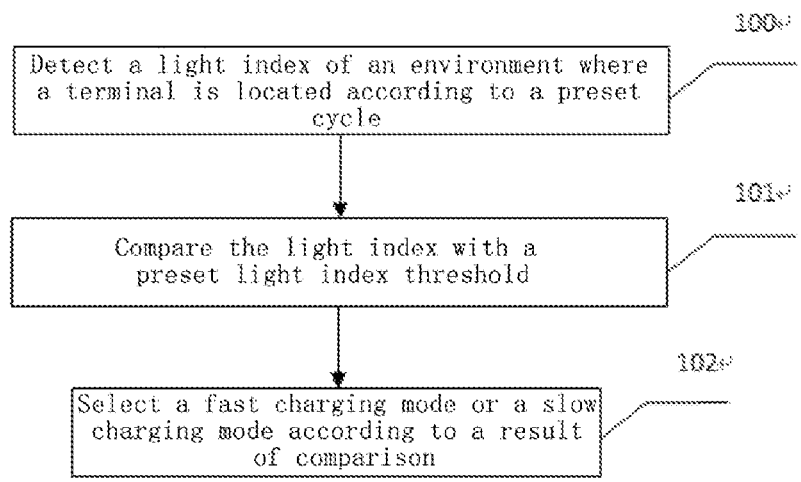
FIG. 1 is a flowchart of a fast/slow charging self-adaption method according to the present application.

FIG. 1 is a flowchart of a fast/slow charging self-adaption method according to the present application. The fast/slow charging self-adaption method of the present application will be described in detail with reference to FIG. 1.

Firstly, in a step of S100, a light index of an environment where a terminal is located is detected according to a preset cycle.

It should be noted that the preset cycle may be set according to experience. For example, the preset cycle may be set to 60 seconds. Since the change of intensity of natural light is gradual, that is, the intensity will not change much in a short time, if the preset cycle is too long, the efficiency of automatically switching between fast charging and slow charging will be decreased.

In an embodiment of the present application, detecting a light index of an environment where a terminal is located includes: detecting the light index of the environment where the terminal is located by means of a light sensor prearranged on the terminal.

It should be noted that the light sensor is an original hardware device of the mobile intelligent terminal, the specific position of which may be set according to the experience of a person having ordinary skill in the art.

In a step of S101, the light index is compared with a preset light index threshold. When the light sensor detects the light index of the environment where the terminal is located, the detected light index is compared with the preset light index threshold.

It should be noted that the aforementioned preset light index threshold may be an average value of light indexes according to a latitude where the terminal is located and sunrises and sunsets in the current season.

The light index threshold may be adjusted according to the weather which the terminal encounters, or comparison with the preset light index threshold may be enabled or disabled, or a time at which the light index threshold is enabled may be set.

In a step of S102, a fast charging mode or a slow charging mode is selected according to a result of comparison. If the detected light index is smaller than the preset light index threshold and a distance value of a proximity switch is greater than a preset distance index threshold, the slow charging mode is applied; if the detected light index is smaller than the preset light index threshold and the distance value of the proximity switch is smaller than or equal to the preset distance index threshold, the fast charging mode is applied; or if the detected light index is greater than or equal to the preset light index threshold, the fast charging mode is applied.

In addition, on the basis of the original hardware design of the mobile intelligent terminal, i.e., without increasing any hardware cost for the user, by calling the light sensor and the proximity sensor through a software process to perform comparison with the preset values and then starting the fast charging and slow charging self-adaption process, the present application can achieve the objective of not only meeting the demand of the user of the mobile intelligent terminal on charging but also protecting the mobile intelligent terminal, thus ultimately improving the experience of the user of the terminal.

Prior to the method of the present application, optional steps also include: detecting the insertion of a charger, starting the operation of a charging chip, and controlling the light sensor and the proximity sensor by means of an application processor.

Compared with the existing technology, the technical scheme of the present application includes: detecting a light index of an environment where a terminal is located according to a preset cycle; comparing the light index with a preset light index threshold; and selecting a fast charging mode or a slow charging mode according to a result of comparison. By detecting a light index of an environment where a terminal is located according to a preset cycle, comparing the light index with a preset light index threshold and selecting a fast charging mode or a slow charging mode according to a result of comparison, the present application can prolong battery life and strike a balance between battery life and charging speed.

The present application can be applied in all mobile intelligent terminal projects that support fast charging, including, but not limited to, high-voltage charging (more than 5 V) and high-current charging (more than 1500 mA).

Figure 2:
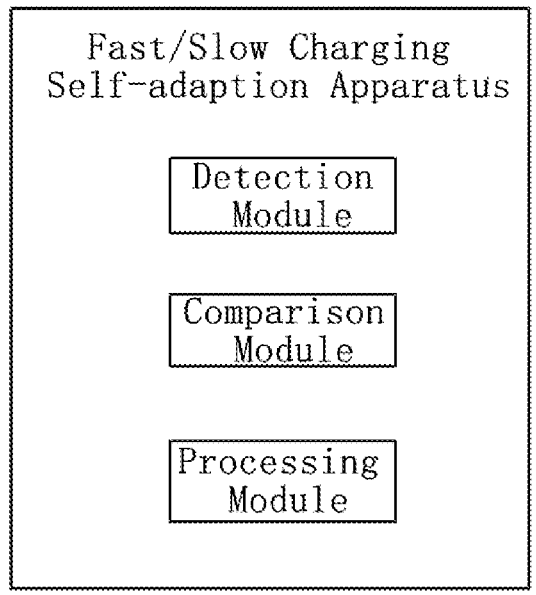
FIG. 2 is a structural diagram of a fast/slow charging self-adaption apparatus according to the present application.

FIG. 2 is a structural diagram of a fast/slow charging self-adaption apparatus according to the present application. As shown in FIG. 2, the fast/slow charging self-adaption apparatus includes a detection module, a comparison module, and a processing module.

The detection module is configured for detecting a light index of an environment where a terminal is located according to a preset cycle by means of a light sensor. In an embodiment, the detection module is configured for detecting the light index of the environment where the terminal is located according to the preset cycle by means of the light sensor prearranged on the terminal.

The comparison module is configured for comparing the light index with a preset light index threshold. In an embodiment, the comparison module is configured for comparing data detected by the light sensor on the light index of the environment where the terminal is located with the preset light index threshold.

The processing module is configured for selecting a fast charging mode or a slow charging mode according to a result of comparison between the light index and the preset light index threshold.

In an embodiment, the processing module is configured for applying the slow charging mode if the light index is smaller than the preset light index threshold and a distance value of a proximity switch is greater than a preset distance index threshold; applying the fast charging mode if the detected light index is smaller than the preset light index threshold and the distance value of the proximity switch is smaller than or equal to the preset distance index threshold; or applying the fast charging mode if the detected light index is greater than or equal to the preset light index threshold.

The present application may further optionally include a presetting unit, which is configured for detecting the insertion of a charger, starting the operation of a charging chip, and controlling the light sensor and the proximity sensor (proximity switch) by means of an application processor.

The fast slow charging self-adaption apparatus according to the present application can automatically select the fast charging mode or the slow charging mode according to an actual condition, and can self-adaptively select slow charging when it is detected that fast charging is not needed, thus effectively protecting the mobile intelligent terminal and prolonging the battery life of the mobile intelligent terminal without affecting use in the daytime, and improving the experience of the user of the terminal.

The method of the present application will be clearly illustrated in detail below with reference to embodiments, and the embodiments are merely used to describe the present application, and are not intended to limit the protection scope of the present application.

Example Embodiment One

Figure 3:
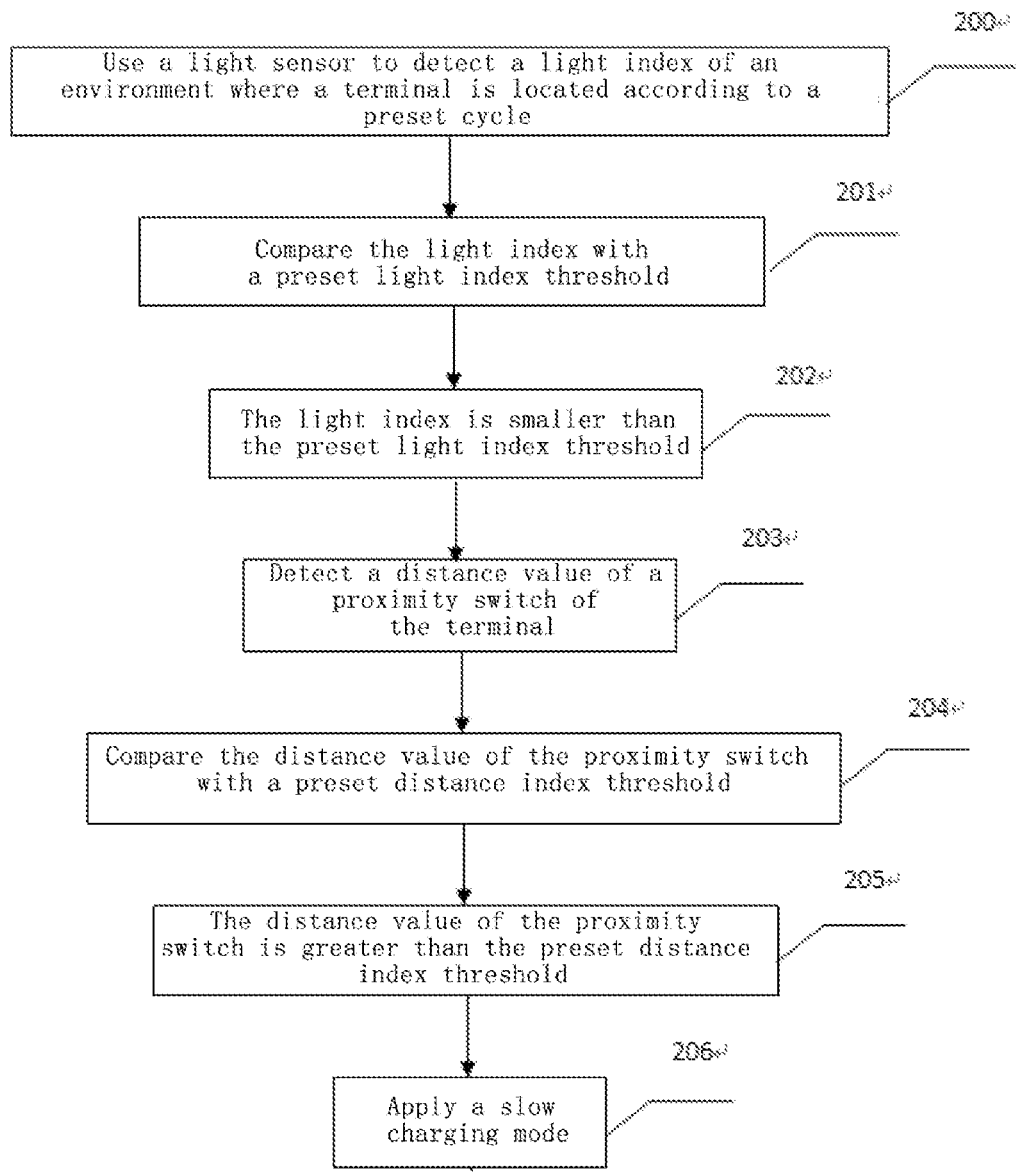
FIG. 3 is a flowchart of a method according to example Embodiment one of the present application.

FIG. 3 is a flowchart of the method according to example Embodiment one of the present invention. As shown in FIG. 3, a charging mode is selected by the following steps S200 to S206.

In a step of S200, a light sensor is used to detect a light index of an environment where a terminal is located according to a preset cycle.

In a step of S201, the light index is compared with a preset light index threshold.

In a step of S202, the light index is smaller than the preset light index threshold.

In a step of S203, a distance value of a proximity switch of the terminal is detected.

In a step of S204, the distance value of the proximity switch is compared with a preset distance index threshold.

In a step of S205, the distance value of the proximity switch is greater than the preset distance index threshold.

In a step of S206, a slow charging mode is applied.

Example Embodiment Two

Figure 4:
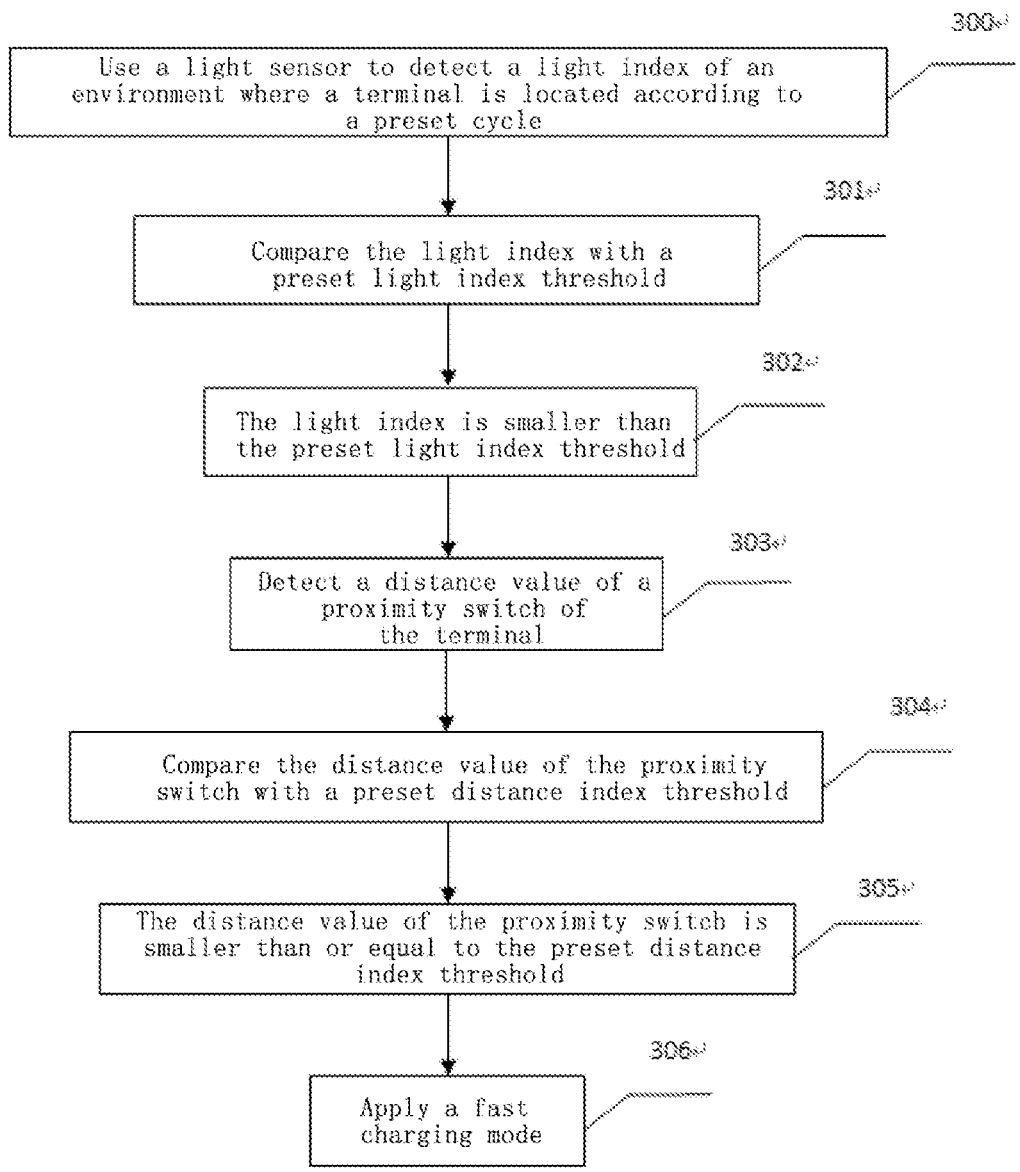
FIG. 4 is a flowchart of a method according to example Embodiment two of the present application.

FIG. 4 is a flowchart of the method according to example Embodiment two of the present application. As shown in FIG. 4, a charging mode is selected by the following steps S300 to S306.

In a step of S300, a light sensor is used to detect a light index of an environment where a terminal is located according to a preset cycle.

In a step of S301, the light index is compared with a preset light index threshold.

In a step of S302, the light index is smaller than the preset light index threshold.

In a step of S303, a distance value of a proximity switch of the terminal is detected.

In a step of S304, the distance value of the proximity switch is compared with a preset distance index threshold.

In a step of S305, the distance value of the proximity switch is smaller than or equal to the preset distance index threshold.

In a step of S306, a fast charging mode is applied.

Example Embodiment Three

Figure 5:
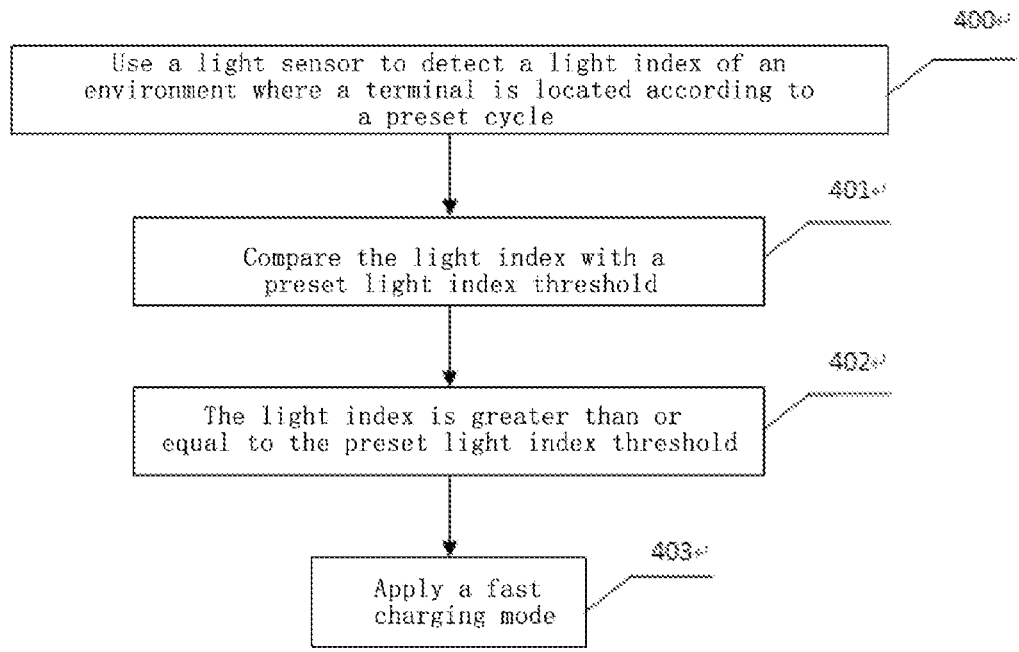
FIG. 5 is a flowchart of a method according to example Embodiment three of the present application.

FIG. 5 is a flowchart of the method according to example Embodiment three of the present application. As shown in FIG. 5, a charging mode is selected by the following steps S400 to S403.

In a step of S400, a light sensor is used to detect a light index of an environment where a terminal is located according to a preset cycle.

In a step of S401, the light index is compared with a preset light index threshold.

In a step of S402, the light index is greater than or equal to the preset light index threshold.

In a step of S403, a fast charging mode is applied.

Figure 6:
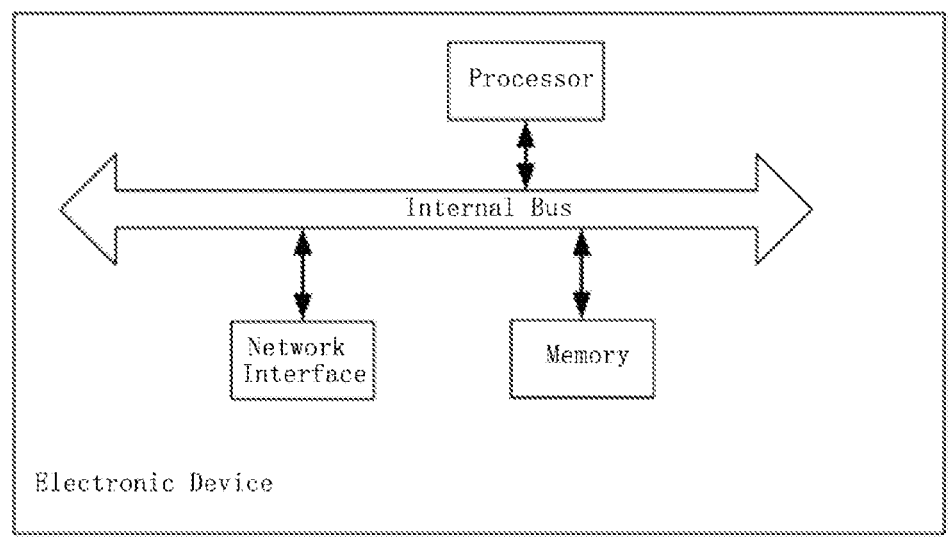
FIG. 6 is a schematic structural diagram of an electronic device according to an embodiment of the present application.

FIG. 6 is a schematic structural diagram of an electronic device according to an embodiment of the present application. As shown in FIG. 6, at the hardware level, the electronic device includes a processor, and optionally may include an internal bus, a network interface, and a memory. The memory may include a random-access memory (RAM), and may also include a non-volatile memory, such as at least one disk memory. Of course, the electronic device may also include hardware required by other services.

The processor, the network interface and the memory may be connected to one another through the internal bus. The internal bus may be an ISA (Industry Standard Architecture) bus, a PCI (Peripheral Component Interconnect) bus, an EISA (Extended Industry Standard Architecture) bus or the like. The bus may be divided into an address bus, a data bus, a control bus and the like. For convenience, only one double-headed arrow is used to represent the internal bus in FIG. 6, but it does not mean that there is only one bus or one type of bus.

The memory is configured for storing a program. In an embodiment, the program may include program codes, which include computer-operable instructions.

The processor reads corresponding computer programs from the nonvolatile memory into the memory and then runs the computer program, forming a shared resource access controller on the logical level. The processor is configured for executing the programs stored in the memory and, executing the following operations:

detecting a light index of an environment where a terminal is located according to a preset cycle; comparing the light index with a preset light index threshold; and selecting a fast charging mode or a slow charging mode according to a result of comparison.

An embodiment of the present application further provides a computer-readable storage medium storing one or more programs which, when executed by a portable electronic device including a plurality of applications, cause the portable electronic device to execute the method according to the embodiment shown in the accompanying drawings, and cause the portable electronic device to execute the following method: detecting a light index of an environment where a terminal is located according to a preset cycle; comparing the light index with a preset light index threshold; and selecting a fast charging mode or a slow charging mode according to a result of comparison.

Although the embodiments disclosed by the present application are as described above, the contents described are only embodiments used to facilitate the understanding of the present application and are not intended to limit the present application. Any person having ordinary skill in the art to which the present application belongs can make any modifications and changes in implementations and details without departing from the protection scope disclosed by the present application. However, the protection scope of the present application is defined by the appended claims.

The invention claimed is:

1. A fast/slow charging self-adaption method, comprising:
   detecting a light index of an environment where a terminal is located according to a preset cycle;
   comparing the light index with a preset light index threshold; and
   selecting a fast charging mode or a slow charging mode according to a result of comparison;
   wherein the preset light index threshold is determined based on at least one of: an average value of light indexes according to a latitude where the terminal is located and sunrises and sunsets in a current season, or weather which the terminal encounters.

2. The method of claim 1, wherein selecting a fast charging mode or a slow charging mode according to a result of comparison further comprises:
   applying the slow charging mode in response to the light index being smaller than the preset light index threshold and a distance value being greater than a preset distance index threshold.

3. The method of claim 1, wherein selecting a fast charging mode or a slow charging mode according to a result of comparison further comprises:
   applying the fast charging mode in response to the light index being smaller than the preset light index threshold and a distance value being smaller than or equal to the preset distance index threshold.

4. The method of claim 1, wherein selecting a fast charging mode or a slow charging mode according to a result of comparison further comprises:
   applying the fast charging mode in response to the light index being greater than or equal to the preset light index threshold.

5. An electronic device, comprising:
a processor; and
a memory storing computer-executable instructions which, when executed by the processor, cause the processor to execute a fast/slow charging self-adaption method comprising:
  detecting a light index of an environment where a terminal is located according to a preset cycle;
  comparing the light index with a preset light index threshold; and
  selecting a fast charging mode or a slow charging mode according to a result of comparison;
  wherein the preset light index threshold is determined based on at least one of: an average value of light indexes according to a latitude where the terminal is located and sunrises and sunsets in a current season, or weather which the terminal encounters.

6. The electronic device of claim 5, wherein selecting a fast charging mode or a slow charging mode according to a result of comparison further comprises:
  applying the slow charging mode in response to the light index being smaller than the preset light index threshold and a distance value being greater than a preset distance index threshold.

7. The electronic device of claim 5, wherein selecting a fast charging mode or a slow charging mode according to a result of comparison further comprises:
  applying the fast charging mode in response to the light index being smaller than the preset light index threshold and a distance value being smaller than or equal to the preset distance index threshold.

8. The electronic device of claim 5, wherein selecting a fast charging mode or a slow charging mode according to a result of comparison further comprises:
  applying the fast charging mode in response to the light index being greater than or equal to the preset light index threshold.

9. A non-transitory computer-readable storage medium, storing one or more programs which, when executed by an electronic device comprising a plurality of applications, cause the electronic device to execute a fast/slow charging self-adaption method comprising:
  detecting a light index of an environment where a terminal is located according to a preset cycle;
  comparing the light index with a preset light index threshold; and
  selecting a fast charging mode or a slow charging mode according to a result of comparison;
  wherein the preset light index threshold is determined based on at least one of: an average value of light indexes according to a latitude where the terminal is located and sunrises and sunsets in a current season, or weather which the terminal encounters.

10. The non-transitory computer-readable storage medium of claim 9, wherein selecting a fast charging mode or a slow charging mode according to a result of comparison further comprises:
  applying the slow charging mode in response to the light index being smaller than the preset light index threshold and a distance value being greater than a preset distance index threshold.

11. The non-transitory computer-readable storage medium of claim 9, wherein selecting a fast charging mode or a slow charging mode according to a result of comparison further comprises:
  applying the fast charging mode in response to the light index being smaller than the preset light index threshold and a distance value being smaller than or equal to the preset distance index threshold.

12. The non-transitory computer-readable storage medium of claim 9, wherein selecting a fast charging mode or a slow charging mode according to a result of comparison further comprises:
  applying the fast charging mode in response to the light index being greater than or equal to the preset light index threshold.

* * * * *